United States Patent [19]

Garms

[11] Patent Number: 4,940,027
[45] Date of Patent: Jul. 10, 1990

[54] MARINE ENGINE WITH WATER COOLED FUEL LINE FROM REMOTE TANK

[75] Inventor: John F. Garms, Menasha, Wis.
[73] Assignee: Brunswick Corp., Skokie, Ill.
[21] Appl. No.: 182,485
[22] Filed: Apr. 15, 1988
[51] Int. Cl.⁵ .................... F02M 31/20; F02B 47/00
[52] U.S. Cl. ................... 123/73 AD; 123/187.5 R; 123/541
[58] Field of Search ........... 123/541, 73 A, 73 AD, 123/DIG. 5, 514, 187.5 R

[56] References Cited

U.S. PATENT DOCUMENTS

| | | | |
|---|---|---|---|
| Re. 26,400 | 6/1968 | Jasper | 123/41.08 |
| 2,466,440 | 4/1949 | Kiekhaefer | 418/154 |
| 2,656,828 | 10/1953 | Conover | 123/DIG. 5 |
| 2,791,186 | 5/1957 | Alden | 417/228 |
| 2,935,057 | 5/1960 | Perlewitz | 123/DIG. 5 |
| 2,952,252 | 9/1960 | Geatty | 123/DIG. 5 |
| 3,541,786 | 11/1970 | Sarra | 60/310 |
| 3,835,822 | 9/1974 | Mickle et al. | 123/41.31 |
| 3,859,951 | 1/1975 | Woodfill | 440/112 |
| 3,886,914 | 6/1975 | Ahkns et al. | 123/73 AD |
| 3,924,975 | 12/1975 | Hundertmark | 417/395 |
| 3,983,857 | 10/1976 | O'Connor | 123/DIG. 5 |
| 3,987,775 | 10/1976 | O'Connor | 123/DIG. 5 |
| 4,059,086 | 11/1977 | Tsubouchi | 123/73 AD |
| 4,220,121 | 9/1980 | Maggiorana | 123/41.8 |
| 4,294,470 | 10/1981 | Tucker | 285/5 |
| 4,301,781 | 11/1981 | Lindberg | 123/541 |
| 4,306,614 | 12/1981 | Maggiorana | 165/35 |
| 4,312,304 | 1/1982 | Tyner | 123/41.74 |
| 4,372,011 | 2/1983 | Aranyos | 24/20 TT |
| 4,392,779 | 7/1983 | Bloemers et al. | 415/141 |
| 4,480,605 | 11/1984 | Bloemers | 123/185 BA |
| 4,491,117 | 1/1985 | Koide | 123/541 |
| 4,504,238 | 3/1985 | Neisen | 440/89 |
| 4,514,106 | 4/1985 | Slager | 403/190 |
| 4,539,949 | 9/1985 | Walsworth | 123/DIG. 5 |
| 4,573,318 | 3/1986 | Entringer et al. | 60/310 |
| 4,583,500 | 4/1986 | Hundertmark | 123/73 AD |
| 4,722,708 | 2/1988 | Baltz | 123/514 |
| 4,728,306 | 3/1988 | Schneider | 440/1 |
| 4,768,492 | 9/1988 | Widmer et al. | 123/41.31 |

FOREIGN PATENT DOCUMENTS 0106123 6/1983 Japan .

Primary Examiner—Willis R. Wolfe
Assistant Examiner—M. Macy
Attorney, Agent, or Firm—Andrus, Sceales, Starke & Sawall

[57] ABSTRACT

A marine propulsion system has a conduit (14) connected between a water cooled internal combustion engine (4) and a remote fuel tank (12). The conduit has a first passage (16) supplying fuel from the tank to the engine, a second passage (18) supplying cooling water from the engine towards the tank, and a third passage (22) returning water from the second passage back to the engine. The passages are in heat transfer relation to the conduit.

5 Claims, 1 Drawing Sheet

MARINE ENGINE WITH WATER COOLED FUEL LINE FROM REMOTE TANK

BACKGROUND AND SUMMARY

The invention relates to marine propulsion systems having a water cooled internal combustion engine and a remote fuel tank, and more particularly to a system for preventing vapor lock. The invention relates to that of commonly owned co-pending application Ser. No. 182,180 entitled "MARINE ENGINE WITH COMBINATION VAPOR RETURN, CRANKCASE PRESSURE, AND COOLED FUEL LINE CONDUIT", now U.S. Pat. No. 4,848,283, to which cross-reference is made.

In a marine propulsion system having a water cooled internal combustion engine and a remote fuel tank, high ambient temperatures heat the fuel in the fuel line between the fuel tank and the engine, and may cause vapor lock. Poor octane fuels also contribute to such condition. The present invention addresses and solves this problem.

DETAILED DESCRIPTION

Figure 1:
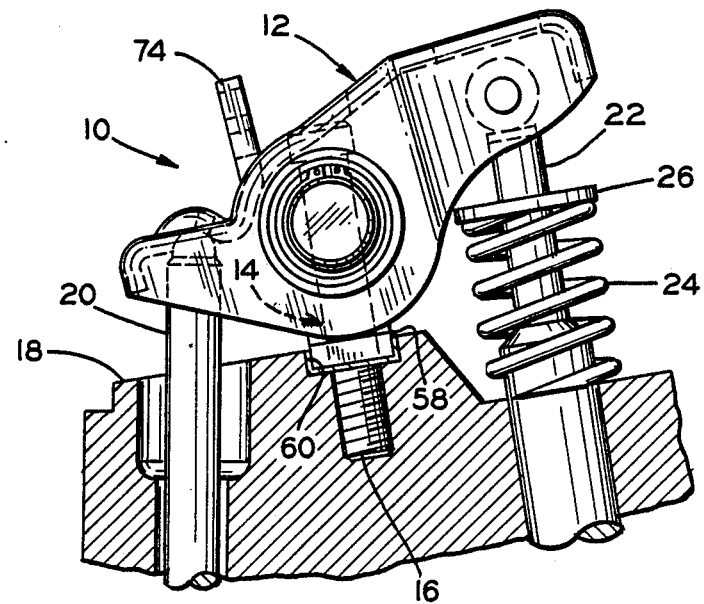
FIG. 1 is a schematic illustration of a marine fuel cooling system in accordance with the invention.
Figure 2:
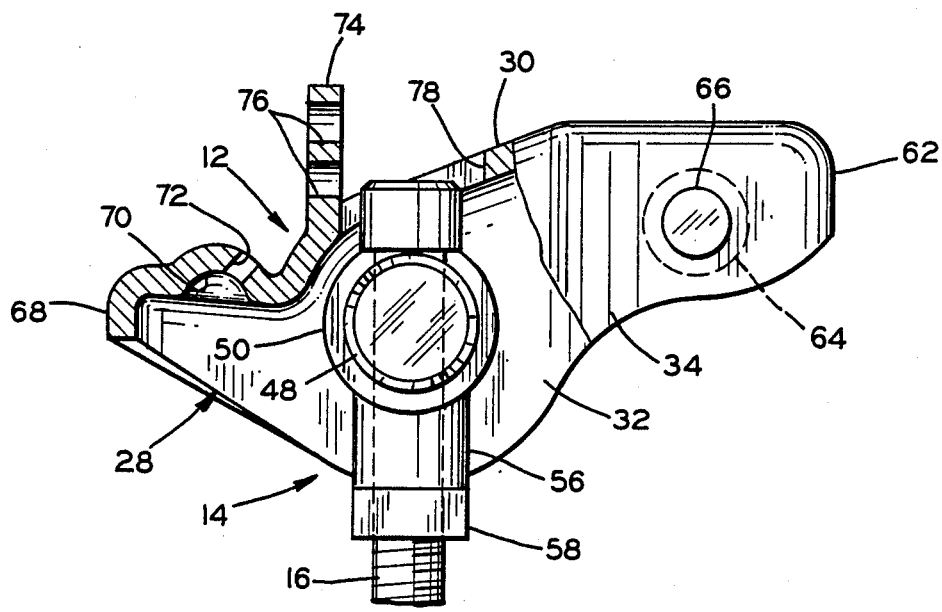
FIG. 2 is a sectional view taken along line 2—2 of FIG. 1.
Figure 3:
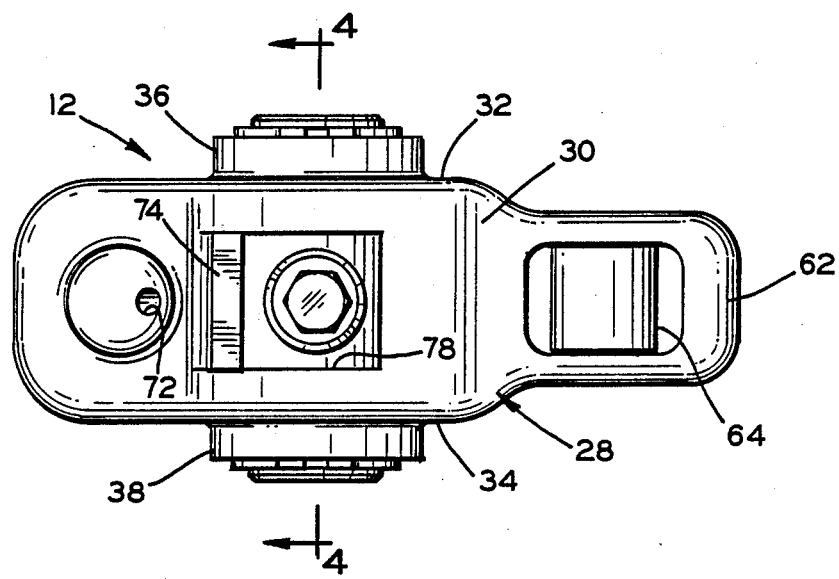
FIG. 3 is a view of a portion of the conduit in FIG. 1.

FIG. 1 shows a marine propulsion system including an outboard drive unit 2 having a power head with a water cooled internal combustion engine 4 and a depending gearcase 6 and propeller 8. The outboard drive unit is mounted to the transom of a boat (not shown) by transom bracket 9. A crankcase compression driven fuel pump 10, *Outboard Service Training Notebook*, Brunswick Corp. Bulletin 90-90592 3-1286, pp. 10-11, and U.S. Pat. No. 3,924,975, incorporated herein by reference, draws fuel from a remote fuel tank 12 within the boat through conduit 14 connected between the fuel tank and the engine. As shown in FIG. 2, conduit 14 has a first passage 16 supplying fuel from tank 12 to engine 4 at fuel pump 10. Conduit 14 has a second passage 18 supplying cooling water from the engine towards the tank from the coolant feed junction 20 from the outlet of the water pump to the engine, *Outboard Service Training Notebock*, Brunswick Corp. Bulletin 90-90592 3-1286, p. 105, and U.S. Pat. Nos. 4,480,605 and 4,312,304, incorporated herein by reference. Conduit 14 includes a third passage 22 returning water from second passage 18 back to the engine at the coolant discharge junction 24 downstream of the thermostat between the thermostat and the exhaust elbow, *Outboard Service Training Notebook*, Brunswick Corp. Bulletin 90-90592 3-1286, p. 105, and U.S. Pat. No. 4,573,318, incorporated herein by reference. Conduit 14 is a molded plastic member, and passages 16, 18 and 22 are in heat transfer relation with each other through the material of such conduit. Passages 18 and 22 communicate through a U-shaped bend 26 proximate the fuel tank, FIG. 3.

Figure 4:
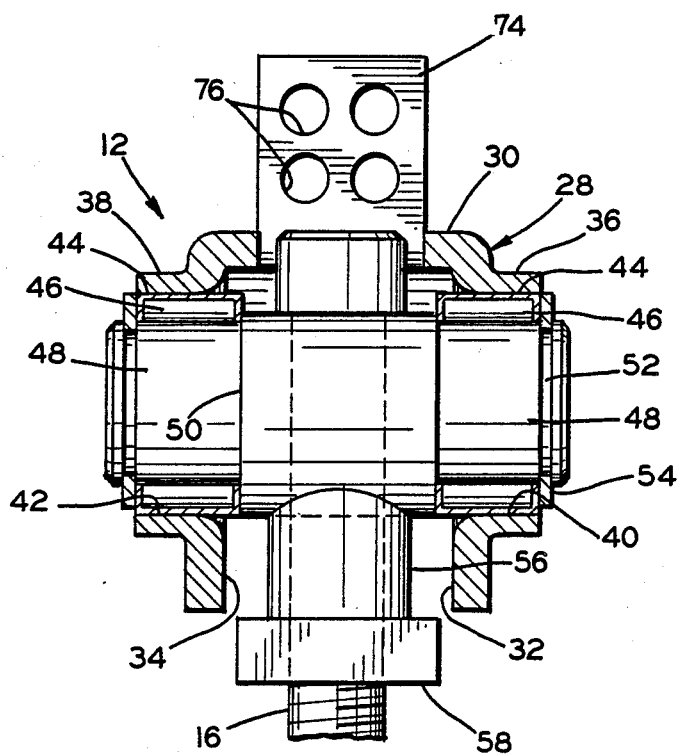
FIG. 4 shows a further embodiment.
Figure 1:
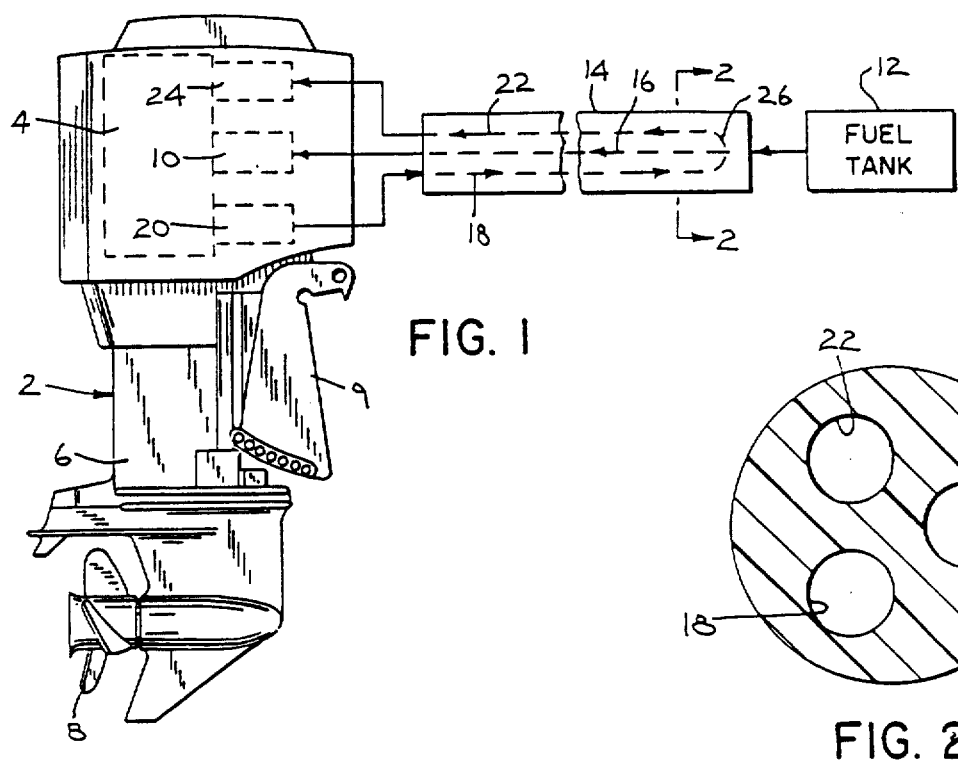
Figure 2:
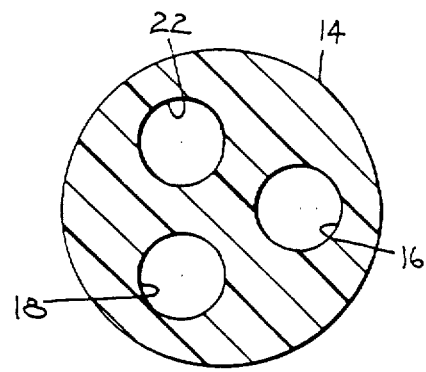
Figure 3:
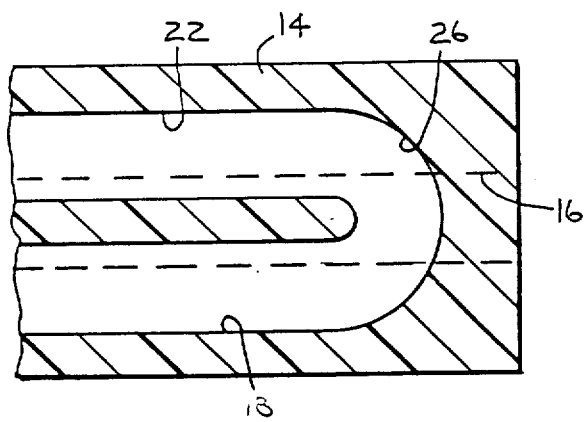
Figure 4:
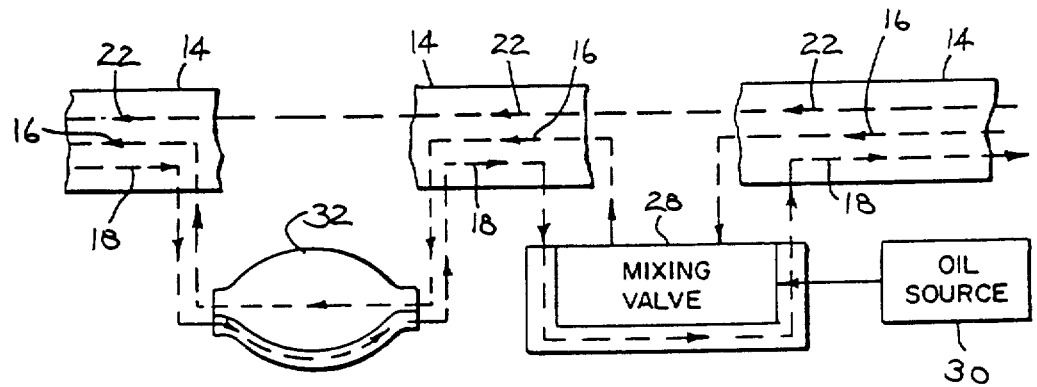

In a further embodiment, FIG. 4, an automatic oil-fuel mixer valve 28, for example as shown in U.S. Pat. No. 4,583,500, incorporated herein by reference, is connected in fuel passage 16 for mixing oil from oil source 30 with the fuel flowing to the engine, and coolant passage 18 and/or 22 is provided around the mixing valve to cool the latter. In a further embodiment, a squeeze bulb 32 is connected in fuel passage 16 for priming the engine, and coolant passage 18 and/or 22 is provided around the squeeze bulb to cool the latter.

It is recognized that various equivalents, alternatives and modifications are possible within the scope of the appended claims.

I claim:

1. A marine propulsion system comprising a water cooled internal combustion engine, a remote fuel tank, a conduit connected between said fuel tank and said engine, said conduit having a first passage supplying fuel from said tank to said engine, said conduit having a second passage supplying cooling water from said engine towards said tank, said conduit having a third passage returning water from said second passage back to said engine.

2. The invention according to claim 1 wherein each of said second and third passages are in heat transfer relation with said first passage.

3. The invention according to claim 2 wherein said second passage communicates with said third passage through a U-shaped bend proximate said fuel tank.

4. The invention according to claim 2 comprising an oil-fuel mixing valve connected in said first passage for mixing oil from an oil source with fuel flowing to said engine, and wherein said mixing valve is cooled with water from one of said second and third passages.

5. The invention according to claim 2 comprising a squeeze bulb connected in said first passage for priming said engine, and wherein said squeeze bulb is cooled with water from one of said second and third passages.

* * * * *

UNITED STATES PATENT AND TRADEMARK OFFICE
CERTIFICATE OF CORRECTION

PATENT NO. : 4,940,027

DATED : July 10, 1990

INVENTOR(S) : JOHN F. GARMS

It is certified that error appears in the above-identified patent and that said Letters Patent is hereby corrected as shown below:

IN THE DRAWINGS

Delete FIGS. 1, 2, 3 and 4, and substitute therefor the attached FIGS. 1, 2, 3 and 4.

The title page should be deleted to appear as per attached title page.

IN THE SPECIFICATION

Col. 1, line 50, delete "Notebock" and substitute therefor -- Notebook --; Col. 2, line 3, delete "18" and substitute therefor -- 16 --.

Signed and Sealed this

Third Day of September, 1991

Attest:

HARRY F. MANBECK, JR.

Attesting Officer

Commissioner of Patents and Trademarks

United States Patent
Garms

Patent Number: 4,940,027
Date of Patent: Jul. 10, 1990

[54] MARINE ENGINE WITH WATER COOLED FUEL LINE FROM REMOTE TANK

[75] Inventor: John F. Garms, Menasha, Wis.
[73] Assignee: Brunswick Corp., Skokie, Ill.
[21] Appl. No.: 182,485
[22] Filed: Apr. 15, 1988
[51] Int. Cl.⁵ .................... F02M 31/20; F02B 47/00
[52] U.S. Cl. .................... 123/73 AD; 123/187.5 R; 123/541
[58] Field of Search ............... 123/541, 73 A, 73 AD, 123/DIG. 5, 514, 187.5 R

[56] References Cited

U.S. PATENT DOCUMENTS

| Re. 26,400 | 6/1968 | Jasper | 123/41.08 |
|---|---|---|---|
| 2,466,440 | 4/1949 | Kiekhaefer | 418/154 |
| 2,656,828 | 10/1953 | Conover | 123/DIG. 5 |
| 2,791,186 | 5/1957 | Alden | 417/228 |
| 2,935,057 | 5/1960 | Perlewitz | 123/DIG. 5 |
| 2,952,252 | 9/1960 | Geatty | 123/DIG. 5 |
| 3,541,786 | 11/1970 | Sarra | 60/310 |
| 3,835,822 | 9/1974 | Mickle et al. | 123/41.31 |
| 3,859,951 | 1/1975 | Woodfill | 440/112 |
| 3,886,914 | 6/1975 | Ahkns et al. | 123/73 AD |
| 3,924,975 | 12/1975 | Hundertmark | 417/395 |
| 3,983,857 | 10/1976 | O'Connor | 123/DIG. 5 |
| 3,987,775 | 10/1976 | O'Connor | 123/DIG. 5 |
| 4,059,086 | 11/1977 | Tsubouchi | 123/73 AD |
| 4,220,121 | 9/1980 | Maggiorana | 123/41.8 |
| 4,294,470 | 10/1981 | Tucker | 285/5 |
| 4,301,781 | 11/1981 | Lindberg | 123/541 |
| 4,306,614 | 12/1981 | Maggiorana | 165/35 |
| 4,312,304 | 1/1982 | Tyner | 123/41.74 |
| 4,372,011 | 2/1983 | Aranyos | 24/20 TT |
| 4,392,779 | 7/1983 | Bloemers et al. | 415/141 |
| 4,480,605 | 11/1984 | Bloemers | 123/185 BA |
| 4,491,117 | 1/1985 | Koide | 123/541 |
| 4,504,238 | 3/1985 | Neisen | 440/89 |
| 4,514,106 | 4/1985 | Slager | 403/190 |
| 4,539,949 | 9/1985 | Walsworth | 123/DIG. 5 |
| 4,573,318 | 3/1986 | Entringer et al. | 60/310 |
| 4,583,500 | 4/1986 | Hundertmark | 123/73 AD |
| 4,722,708 | 2/1988 | Baltz | 123/514 |
| 4,728,306 | 3/1988 | Schneider | 440/1 |
| 4,768,492 | 9/1988 | Widmer et al. | 123/41.31 |

FOREIGN PATENT DOCUMENTS 0106123 6/1983 Japan .

*Primary Examiner*—Willis R. Wolfe
*Assistant Examiner*—M. Macy
*Attorney, Agent, or Firm*—Andrus, Sceales, Starke & Sawall

[57] ABSTRACT

A marine propulsion system has a conduit (14) connected between a water cooled internal combustion engine (4) and a remote fuel tank (12). The conduit has a first passage (16) supplying fuel from the tank to the engine, a second passage (18) supplying cooling water from the engine towards the tank, and a third passage (22) returning water from the second passage back to the engine. The passages are in heat transfer relation to the conduit.

5 Claims, 1 Drawing Sheet

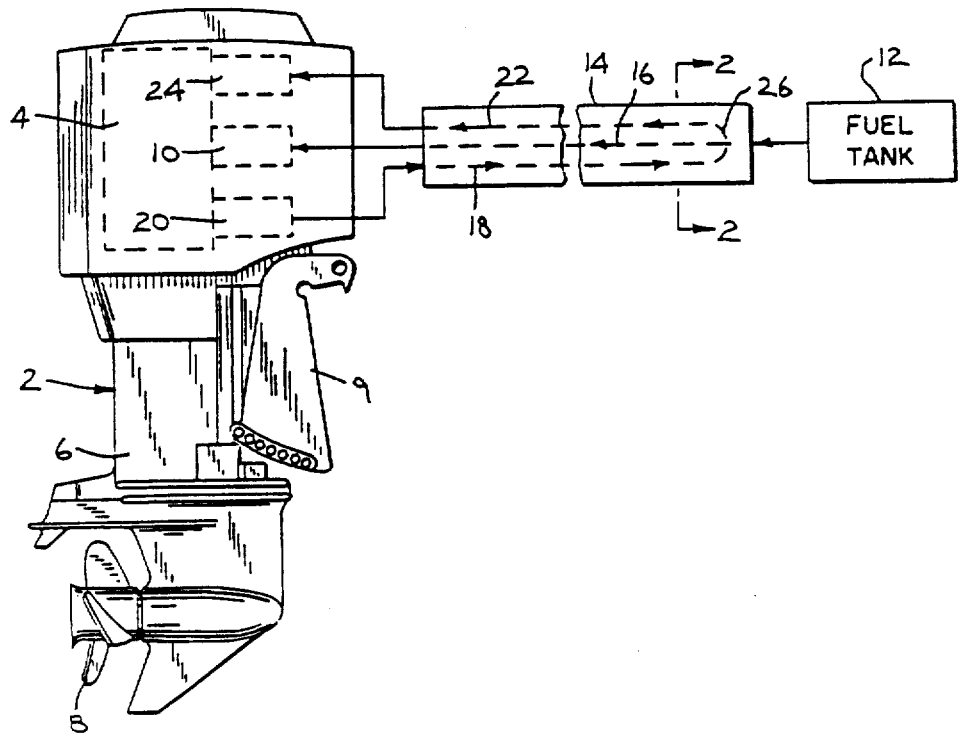

Patent No. 4,940,027